Patented May 18, 1954

2,678,899

UNITED STATES PATENT OFFICE 2,678,899

STABLE SOLUTION OF PHYSOSTIGMINE

Clemmy O. Miller, Milwaukee, Wis., assignor to Kremers-Urban Co., Milwaukee, Wis., a corporation of Wisconsin No Drawing. Application April 11, 1952,
Serial No. 281,909

5 Claims. (Cl. 167—67)

This invention relates to a process for making a stable aqueous solution of physostigmine or of a salt of physostigmine and one or more compounds blocking the action of physostigmine on the autonomic nervous system, or the salts thereof, and which are selected from the class of atropine-like substances.

This application is a continuation-in-part of my application Serial No. 3,181, filed January 20, 1948, and now abandoned.

The pharmacological and therapeutic value of drugs such as the alkaloid physostigmine and its salts, in augmenting the action of the parasympathetic nervous system and in relaxing human voluntary or skeletal muscles is well known and freshly made aqueous physostigmine solutions have been heretofore used for relaxing voluntary muscle. However, such solutions decompose spontaneously and exposure to sunlight and air greatly facilitates decomposition. There is no way, short of failure in use, to determine whether or not a solution has so decomposed as to be ineffective or even dangerous. Fresh solutions must accordingly be prepared from time to time to be certain of the potency of the solutions, and old solutions are discarded even though they may actually be sufficiently potent and otherwise in useful condition. Preparation of solutions is inconvenient and time-consuming and may cause delays dangerous to patients under some conditions.

The use of physostigmine and its salts for reducing spasm of skeletal muscle, is however attended by undesirable side reactions of the autonomic nervous system such as constriction of the pupil of the eye, stimulation of involuntary muscles and particularly those of the intestinal tract, excessive salivation and sweating, and other undesirable effects. Such undesirable effects of the use of physostigmine can be controlled or minimized by the administration simultaneously therewith of one of the group of atropine or an atropine-like compound such as methylatropine, homatropine, homatropine methylbromide, eucatropine and/or its functional equivalents such as 1-hyoscyamine, or their water soluble salts, which act on the autonomic system to reduce or block the undesirable effects of physostigmine. But aqueous solutions of physostigmine or the salts of physostigmine and of one or more of the above compounds or their salts, are also unstable in aqueous solutions and must frequently be made fresh. The solutions must be stable under both the conditions required for rapid sterilization and for storage even when the storage conditions are most unfavorable for the present composition, as when the compositions are in contact with air and exposed to direct sunlight.

It is therefore one object of the present invention to provide a solution of physostigmine or its salts together with one or more compounds blocking or counteracting the undesirable effects of the physostigmine, for parenteral administration to human beings and which will retain its efficacy for an indefinite length of time, and will not decompose into products possibly harmful to some patients.

Another object of the invention is to provide a solution of physostigmine and one or more of the group of atropine and atropine-like compounds, such as methylatropine, homatropine, homatropine methylbromide, eucatropine and 1-hyoscyamine, and their water soluble salts, and which is suitable for subcutaneous, intra-muscular and intravenous injection into human beings and which solution will be stable during sterilization and for an extended length of time under the usual storage conditions and time of storage for pharmaceuticals.

Another object of the invention is to provide a composition including a physostigmine compound, atropine or an atropine-like compound and a stabilizing agent in isotonic aqueous solution for injection into human beings by any route and for minimizing or reducing spasm of human voluntary muscle without producing undesirable side reactions or with a minimum of such reactions as are produced by the action of physostigmine on the autonomic nervous system of human beings.

Generally, the present invention includes a process for making a stable aqueous solution of physostigmine and its water soluble salts, and of atropine or an atropine-like compound such as 1-hyoscyamine, or their water soluble salts, by the addition to the solution of an agent of the class having a reducing action, the reducing agent being non-irritating to human tissue, non-toxic and water soluble.

The physostigmine and the atropine-like compounds are antagonistic and must be in particular proportions to obtain the desired effects. As an example, physostigmine to atropine compounds in the proportion (by weight) of 3:1 produces either excessive side reactions or can be otherwise tolerated only by a limited number of patients. The proportion of 1 part of physostigmine to 3 parts of atropine (1:3), also produces undesirable side effects or otherwise makes the patient ill. However, 1 part of physostigmine to 1 part of atropine (1:1) or 2 parts of physostigmine to 1 part of hyoscyamine (2:1) has proved to be completely satisfactory excepting in a few cases. When the other above-mentioned atropine-like substances are used, 1 part of physostigmine is pharmacologically balanced by approximately 3 parts (1:3) of atropine-like materials, although even the proportion 1:4 may be used.

The reducing agent is preferably sodium bisulfite, but other non-toxic reducing agents may be used especially as the concentration of such reducing agent is kept at a low value which can be tolerated by most patients. The solution should be isotonic to human blood and sodium chloride is preferred for that purpose. The reducing agent contributes to the total solids in solution and is not as desirable as sodium chloride in producing isotonicity of the solutions. Hence, the maximum amount of sodium bisulfite used is only two times the minimum quantity necessary to coact with the pH value in stabilizing the solutions.

When the solutions are properly made, they are colorless (water white) and any color developed (pink to red) is an indication of decomposition of the physostigmine, and such solutions should be discarded. Both the quantity of reducing agent and the pH value must be kept within given limits and a particular relationship must be maintained between the range of reducing agent quantity used and the range of pH values of the solutions. The preferred range for the bisulfite is 0.5 to 1.0 gm. per liter as producing a composition most likely to be useful under all conditions. The pH value of the solution may vary from 2.5 to 6.5 but is preferably kept between 3.5 and 4.5.

At the present time the solutions are furnished only in one concentration which, by clinical use and pharmacological test, has been found to be the maximum concentration useful for dosages of 1 cc. of solution. The amounts of both the physostigmine and the atropine group of compound, which are given in the following examples, produce the desired maximum therapeutic effect and the dosage can be readily varied by a physician.

Example I 1.0 gm. of sodium bisulfite and 9.0 gm. of sodium chloride are dissolved in approximately 300 cc. of distilled water which has been freshly boiled and cooled to remove dissolved gases and particularly oxygen. 0.6 gm. of physostigmine salicylate and 0.6 gm. of atropine sulfate are added and the solution is diluted to 1000 cc. with distilled water which has also been freshly boiled and cooled. The pH of the solution is then adjusted to the range of 3.5 to 4.5 by the addition of either dilute hydrochloric acid or sodium hydroxide solution, if necessary.

After the above solution is prepared, a physiologically inert gas such as nitrogen or carbon dioxide and which is also chemically inert to the physostigmine and atropine compounds, is passed through the solution to displace any oxygen or air remaining in the solution or above the solution within the containing vessel. The solution may then be filled into vials or ampuls by procedures usual in the pharmaceutical industry in the manufacture of solutions for parenteral use. The air over the solution in the ampuls or vials is also replaced by the inert gas. The solutions are then sterilized by autoclaving at 15 lbs. steam pressure for 20 minutes. All of the processing is done without exposure of the preparation to direct sunlight and especially to bright sunlight.

Example II

When a composition is to utilize homatropine, methylatropine, homatropine methylbromide, eucatropine or the like, the proportions of the two therapeutically active compounds are quite different from those in Example I. Such different proportions probably result from the difference in potency between atropine and the atropine-like composition above listed. Thus, for 0.6 gm. per liter of physostigmine salicylate, up to 2.5 gm. per liter of homatropine, etc. are required, the proportions in the present instance being approximately 1:4. The same amount of sodium bisulfite and of sodium chloride are used as stated in Example I. The procedure for preparation of the present solution is exactly like that of the first example.

It is to be especially noted both that the same amount of reducing agent is required and that the pH value is maintained in the range 3.5 to 4.5 as was previously done even though the proportions of the therapeutically active components are quite different than in the preceding example.

Example III

When 1-hyoscyamine hydrobromide is to be used, only 0.3 gm. per liter of the 1-hyoscyamine compound is required to balance 0.6 gm. per liter of physostigmine salicylate. The proportion of 2 parts of physostigmine to 1 part of 1-hyoscyamine (2:1) produces the desired effects and blocks the undesirable actions of the physostigmine. The above stated amount of sodium bisulfite is used in the present composition and the above stated pH range is maintained for preventing decomposition of the active components of the solutions. In the present composition it is especially important to keep the pH value low as 1-hyoscyamine is changed to the less potent d-hyoscyamine at neutral or alkaline pH.

The procedure above is followed with any salt of physostigmine, and any of the group of atropine compounds or their salts. Any water soluble salt other than the salicylate or hydrobromide may be used, such as the chloride or hydrochloride, the nitrate or the sulfate, all of which are water soluble and non-toxic.

Pharmacological studies and clinical tests show that 0.6 gm. per liter of a physostigmine (6 mg. per cc.) is the optimum quantity for the majority of patients. To produce the best therapeutic response, the above quantity of physostigmine must be pharmacologically balanced with the atropine or atropine-like compound to exactly block the undesirable effect of physostigmine. I have found that the best proportions are as follows:

1 part physostigmine to 1 part atropine
2 parts physostigmine to 1 part 1-hyoscyamine
1 part physostigmine to 3 to 4 parts of the other listed atropine-like compounds.

If the above proportions are not maintained, undesirable effects of physostigmine or of the autonomic blocking compounds result and the solutions fail to have the effects expected of them.

When U. S. P. or N. F. grades of all of the components are used, it has been found that 2.0 gm. of reducing agent, is sufficient to avoid decomposition of the physostigmine provided the preparation procedure is followed as described and the stated pH range is maintained. A greater amount of sodium bisulfite is not useful in preventing decomposition and makes the solutions hypertonic with the possibility of other undesirable effects. It is possible to go as near to the neutral point as pH 6.5 but the solutions are kept definitely acid and preferably in the range of pH 3.5–4.5.

The stabilities of the solutions were shown by separately testing (1) hyoscyamine hydrobromide alone, and (2) physostigmine salicylate alone and solutions of (3) hyoscyamine hydrobromide and (4) hyoscyamine sulfate, but without sodium bisulfite and at various pH values.

(1) A 5% aqueous solution of hyoscyamine hydrobromide was prepared using air-free water only (without a reducing agent) and such solutions were divided into portions respectively adjusted to pH 2.5, pH 3.5 and pH 4.0 to pH 9.0, the pH 4.0 to 9.0 solutions being in steps of 0.5 pH. All of the solutions were sterilized in an autoclave at 15 lbs. steam pressure for 20 minutes and were then placed in an incubator at 35° C. for 4 weeks. The following readings of optical rotation, $(\alpha)_D^{26}$, were taken:

|  | pH 2.5 to 8.5 | pH 9.0 |
|---|---|---|
| before and after sterilizing | −(23.0 to 25.0) | −17.5 |
| one week incubation | −(23.0 to 25.0) | −17.5 |
| two weeks' incubation | −(24.0 to 26.0) | −17.5 |

|  | pH 2.5 to 8.0 | pH 8.5 | pH 9.0 |
|---|---|---|---|
| four weeks' incubation | −(24.0–25.5) | −22.0 | −17.5 |

The above shows that solutions of l-hyoscyamine compounds alone are stable at low pH values but begin to disintegrate in four weeks' time at even slightly alkaline pH, and that the solutions are unsuitable for parenteral use at any time when they are materially alkaline.

Aqueous solutions of 0.6 gm. per liter of physostigmine salicylate tested, both without and with l-hyoscyamine sulfate, in the concentrations and at the pH values indicated below but without use of sodium bisulfite, gave the following results after sterilization:

| pH | physostigmine with— | | |
|---|---|---|---|
|  | (2) physostigmine 0.6 gm. per liter | (3) l-hyoscyamine hydrobromide 0.3 gm. per liter | (4) l-hyoscyamine sulfate 0.3 gm. per liter |
| 3.0 | faint pink | faint pink |  |
| 3.5 |  |  | light orange. |
| 4.0 | orange | orange |  |
| 4.5 |  |  | cherry red. |
| 5.0 | cherry red | cherry red |  |
| 8.0 |  |  | dark cherry red. |

All colors obtained with l-hyoscyamine hydrobromide were lighter than those with the sulfate.

The above color differences show the varying degrees of stability at different pH values when the solutions are sterilized as is necessary for pharmaceutical use but without use of a reducing agent. The differences in color also show that none of the l-hyoscyamine compounds materially affects instability of the physostigmine.

An aqueous solution (5) of 0.6 mg. of physostigmine salicylate and 0.3 mg. l-hyoscyamine hydrobromide was divided into 20 portions, each with different concentrations (in steps of 1/10 gm. per liter) of sodium bisulfite and each one of such portions was divided into 3 further parts which were adjusted to pH 3.5, 4.5 and 8.0, respectively. The solutions were sterilized and the following results were obtained:

| Sodium bisulfite concentration, gm. per liter | pH 3.5 | pH 4.5 | pH 8.0 |
|---|---|---|---|
| 0.1 | red | red | red. |
| 0.2–0.4 | colorless | colorless | Do. |
| 0.5–1.1 | do | do | dark pink. |
| 1.2–2.0 | do | do | pinkish to faint pink. |

After sterilizing, one series (6) of the above solutions were placed in direct sunlight. After three days the solutions having only 0.2 to 0.5 gm. per liter of sodium bisulfite changed to a pink color, while the solutions with 0.6 to 2.0 sodium bisulfite did not change color.

Other tests were made of the stability of solutions of 0.6 gm. per liter of physostigmine salicylate with several different atropine-like compounds. The solutions were all adjusted to pH 4.0 and various concentrations of sodium bisulfite were used with the following results:

| sodium bisulfite gm. per liter | (7) homatropine methylbromide 3.0 gm. per liter | (8) eucatropine hydrochloride 3.0 gm. per liter |
|---|---|---|
| 0.0 | dark orange | orange. |
| 0.5 | colorless | colorless. |
| 1.0 | do | Do. |
| 2.0 | do | Do. |

Each of the above solutions was sterilized as previously described. It is evident that the above solutions are not stable at even the pH value of 4.0 unless approximately 0.5 gm. per liter of sodium bisulfite is present.

Solutions of 0.6 gm. per liter of physostigmine salicylate were made with 0.1 and 0.2 gm. per liter of homatropine methylbromide, (10) and (11), and with 0.1 and 0.2 gm. per liter of eucatropine hydrochloride, (12) and (13). Each of the solutions (10 to 13) contained 0.5 gm. per liter of sodium bisulfite and was adjusted to pH 4.0 and the solutions were sterilized as above described. Each solution was completely colorless after completing the sterilization.

The above tests show that present product is stable with a combination of sodium sulfite in concentrations of at least 0.5 gm. per liter at pH 3.5 to 4.5 even under forced aging conditions, such as incubation at 35° C. or exposure to direct sunlight. Neither the above sodium bisulfite concentration nor the above pH values alone, are sufficient to secure the desired result. However, with the combination of sodium bisulfite concentration and pH values above stated, it is no longer necessary to take special precautions in handling the product. Thus it is obvious that the sodium bisulfite coacts with the pH value in preventing decomposition of physostigmine which is indicated by color change. Hence, it is evident that the sodium bisulfite concentration is critical as to lower limit at least and that less than 0.5 gm. per liter will not prevent decomposition in solutions even at a pH range of 3.5 to 4.5 which is the preferred range. Because solutions with only 0.5 gm. sodium bisulfite did discolor in direct sunlight and because physicians may permit such exposure of their supplies, 1.0 gm. is used to insure stability under the severest storage conditions.

A number of solutions of physostigmine have been prepared with the different alkaloids of the atropine group different relative activity. Even though such solutions have generally included 1.0 gm. per liter of sodium bisulfite, that quantity may be reduced if not tolerable by a particular patient provided the pH value is slightly decreased.

The essential feature of my invention is the provision of isotonic solutions of a physostigmine compound to produce skeletal muscle relaxation with one or more compounds preventing the undesired effects of physostigmine. The solutions are made in a series of active component proportions found to give the best therapeutic response for different combinations of the active components. The solutions are stable during preparation including sterilizing procedure which destroys all living organisms and spores, and remain stable for indefinite period under normal storage conditions and time for pharmaceuticals. Exposure of the compositions, given in the examples, for three weeks in direct sunlight, does not produce color change. Such exposure is more severe than any storage conditions likely to occur in practice. During a number of years of commercial handling of the solutions, there has been no indication of decomposition of any one of the preparations.

It is evident from the above that solutions of the atropine group of compounds and physostigmine and combinations thereof, are all unstable, that none of such compounds affect the stability or instability of the other, that sodium bisulfite must be present in at least the quantity of 0.5 gm. per liter and that the pH range should be 3.5–4.5. In all of the compositions, the bisulfite and pH relationship is necessary to prevent decomposition of the physostigmine. In compositions with l-hyoscyamine, it is believed that the stated pH range is also essential to prevent change of l-hyoscyamine to the d-hyoscyamine form which has a materially lower potency than the l-hyoscyamine form and also has undesired effects on the central nervous system.

I claim:

1. A composition of matter for therapeutic purposes and comprising substantially oxygen-free water, a water-soluble salt of physostigmine in sufficient quantity to reduce spasm of voluntary muscle, a water-soluble parasympathetic blocking agent chosen from the group consisting of atropine, l-hyoscyamine, methylatropine, homatropine methylbromide, l-hyoscyamine, eucatropine and the water-soluble salts thereof in such proportions to the amount of physostigmine salt as to antagonize the parasympathetic stimulating effects of the physostigmine salt, the composition being adjusted to a pH value in the range of 3.5 to 4.5, and 0.5 to 1.0 gm. per liter of a physiologically-suitable water-soluble bisulfite of a metal as a stabilizing agent to coact with the pH value of the composition for preventing decomposition of the physostigmine salt upon sterilization and during storage.

2. A composition of matter for therapeutic purposes and comprising substantially oxygen-free water, physostigmine and atropine as water-soluble salts in the proportion of 1 part of physostigmine to 0.75 to 1.25 parts of atropine and in quantities up to 1.0 gm. each per liter of the composition, and 0.5 to 1.0 gm. of a physiologically suitable water-soluble bisulfite of a metal per liter of the composition, the pH of the composition being adjusted to 3.5 to 4.5, the bisulfite being in sufficient quantity at a pH value within in the given range for preventing decomposition of the physostigmine salt upon sterilization and during storage.

3. A solution for parenteral injection in humans and comprising substantially oxygen-free water, a water-soluble salt of physostigmine in a quantity up to 1.0 gm. per liter of the solution, a water-soluble salt of atropine in sufficient quantity to block the parasympathetic stimulating effect of the physostigmine salt, and 0.5 to 1.0 gm. of sodium bisulfite per liter of solution, the pH of the solution being adjusted to 3.5 to 4.5, the sodium bisulfite being in sufficient quantity at a pH value of the solution within the given range for preventing decomposition of the physostigmine salt upon sterilization and storage of the solution.

4. A composition of matter for therapeutic purposes and comprising substantially oxygen-free water, physostigmine and l-hyoscyamine as water-soluble salts in proportions of 1 part of physostigmine to 0.375 to 0.625 parts of l-hyoscyamine and in quantities up to 1.0 gm. of physostigmine per liter, and 0.5 to 1.0 gm. of a physiologically suitable water-soluble bisulfite of a metal per liter, the pH of the composition being adjusted to 3.5 to 4.5, the bisulfite being sufficient in quantity at a pH value within the given range for preventing decomposition of the physostigmine salt upon sterilization and during storage.

5. A solution for parenteral injection in humans and comprising substantially oxygen-free water, a water-soluble salt of physostigmine in a quantity up to 1.0 gm. per liter, a water-soluble salt of l-hyoscyamine in sufficient quantity to block the parasympathetic stimulating effect of the physostigmine salt, and 0.5 to 1.0 gm. of sodium bisulfite per liter, the pH of the solution being adjusted to 3.5 to 4.5, the sodium bisulfite being sufficient at a pH value within the given range for preventing decomposition of the physostigmine salt upon sterilization and storage of the solution.

References Cited in the file of this patent

UNITED STATES PATENTS

| Number | Name | Date |
| --- | --- | --- |
| 2,047,144 | Kharasch | July 7, 1936 |
| 2,250,553 | Ruskin | July 29, 1941 |

OTHER REFERENCES

Goldman The Journal Lancet, December 1946, pp. 415, 418.

Hanson The Pharm. J., June 1, 1946, p. 355.

Rae, ibid, May 25, 1946, p. 329.

Hcks, Am. J. Ophthalmology, 1937, pp. 1040–1041.

British Pharmaceutical Codex, 1923, pp. 837–839.